US007275900B1

(12) United States Patent
Phillips et al.

(10) Patent No.: US 7,275,900 B1
(45) Date of Patent: Oct. 2, 2007

(54) ROUTER ELEVATING MECHANISM

(75) Inventors: Alan Phillips, Jackson, TN (US); John W. Schnell, Jackson, TN (US)

(73) Assignee: Black & Decker Inc., Newark, DE (US)

( * ) Notice: Subject to any disclaimer, the term of this patent is extended or adjusted under 35 U.S.C. 154(b) by 31 days.

(21) Appl. No.: 10/900,058

(22) Filed: Jul. 26, 2004

Related U.S. Application Data

(60) Provisional application No. 60/490,117, filed on Jul. 25, 2003.

(51) Int. Cl.
*B23C 1/20* (2006.01)

(52) U.S. Cl. ........................ 409/182; 409/181; 408/14; 144/136.95

(58) Field of Classification Search ................ 409/182, 409/175, 180, 181, 183, 184, 185, 186, 187, 409/178, 131; 144/136.95, 154.5, 135.2, 144/371, 134.1; 408/181, 182, 16, 241 S, 408/124, 14
See application file for complete search history.

(56) References Cited

U.S. PATENT DOCUMENTS 712,843 A 11/1902 Paul
1,370,895 A 3/1921 Loomis
1,514,894 A 11/1924 Carter
1,565,790 A 12/1925 Carter
1,584,078 A 5/1926 Carter
1,820,162 A 8/1931 Salvat
1,874,232 A 8/1932 Groene et al.
2,353,202 A 7/1944 Tautz
2,425,245 A 8/1947 Johnson
2,504,880 A 4/1950 Rittenhouse
2,513,894 A 7/1950 Rogers
2,799,305 A 7/1957 Groehn
3,289,718 A 12/1966 Willis
3,436,090 A 4/1969 Lange et al.

(Continued)

FOREIGN PATENT DOCUMENTS

CA 500134 2/1954

(Continued)

OTHER PUBLICATIONS

#9000-04 Advantage Rotary Saw™ Kit; © 2000 Dremel; http://www.dremel.com/productdisplay/tool_template2.asp?SKU=9000-04&Color=99CCFF, #9000-04 Advantage Rotary Saw Kit, Mar. 21, 2003, 1 page.

(Continued)

*Primary Examiner*—Dana Ross
(74) *Attorney, Agent, or Firm*—Scott B. Markow

(57) ABSTRACT

The present invention is directed to an elevating mechanism, in particular to an elevating mechanism for routers, is configured for easy micro adjustment and coarse or macro adjustment. In an embodiment, a power tool includes a base configured to adjustably receive a motor housing for operating a working tool. A worm drive is pivotally coupled, in an eccentric configuration, to an eccentric lever. The eccentric lever is adjustably coupled to at least one of the housing or the base such that the eccentric lever is operable to cause the worm drive to be positioned into an engaged position with a rack assembly and a released position wherein the worm drive is remote from the rack assembly. The elevating mechanism is operable to permit rotational micro adjustment and macro manual adjustment wherein the worm drive is remote from the rack assembly for permitting coarse adjustment of the motor housing with respect to the base.

36 Claims, 6 Drawing Sheets

U.S. PATENT DOCUMENTS

| | | | | |
|---|---|---|---|---|
| 3,443,479 | A | 5/1969 | Hawley et al. | |
| 3,451,133 | A | 6/1969 | Hathaway et al. | |
| 3,466,973 | A | 9/1969 | Rees | |
| 3,481,453 | A | 12/1969 | Shreve, III et al. | |
| 3,487,747 | A | 1/1970 | Burrows et al. | |
| 3,494,395 | A | 2/1970 | Graham | |
| 3,512,740 | A | 5/1970 | Podwalny | |
| 3,587,387 | A | 6/1971 | Burrows et al. | |
| 3,710,833 | A | 1/1973 | Hammer et al. | |
| 3,767,948 | A | 10/1973 | Batson | |
| 3,791,260 | A | 2/1974 | Ambler et al. | |
| 3,827,820 | A | 8/1974 | Hoffman | |
| 3,905,273 | A | 9/1975 | Shook | |
| 4,051,880 | A | 10/1977 | Hestily | |
| 4,085,337 | A * | 4/1978 | Moeller | 408/124 |
| 4,085,552 | A | 4/1978 | Horine et al. | |
| 4,102,370 | A | 7/1978 | Vess | |
| 4,108,225 | A | 8/1978 | Hestily | |
| 4,143,691 | A | 3/1979 | Robinson | |
| 4,239,428 | A | 12/1980 | Berzina | |
| 4,294,297 | A | 10/1981 | Kieffer | |
| 4,319,860 | A | 3/1982 | Beares | |
| D267,492 | S | 1/1983 | Schieber | |
| 4,410,022 | A | 10/1983 | Peterson | |
| 4,445,811 | A | 5/1984 | Sanders | |
| 4,537,234 | A | 8/1985 | Onsrud | |
| 4,562,872 | A | 1/1986 | Fushiya et al. | |
| 4,593,466 | A | 6/1986 | O'Brien | |
| D286,132 | S | 10/1986 | Yamamoto | |
| 4,615,654 | A | 10/1986 | Shaw | |
| 4,652,191 | A | 3/1987 | Bernier | |
| 4,679,606 | A | 7/1987 | Bassett | |
| 4,718,468 | A | 1/1988 | Cowman | |
| 4,738,571 | A | 4/1988 | Olson et al. | |
| 4,770,573 | A | 9/1988 | Monobe | |
| D300,501 | S | 4/1989 | Zurwelle | |
| 4,830,074 | A | 5/1989 | Lundblom | |
| RE33,045 | E | 9/1989 | Gronholz et al. | |
| 4,872,550 | A | 10/1989 | Stranges | |
| 4,924,571 | A | 5/1990 | Albertson | |
| 4,938,642 | A | 7/1990 | Imahashi et al. | |
| 5,012,582 | A | 5/1991 | Bristol et al. | |
| 5,025,841 | A | 6/1991 | Totten | |
| 5,056,375 | A | 10/1991 | Kapton et al. | |
| 5,062,460 | A | 11/1991 | DeLine | |
| 5,074,724 | A | 12/1991 | McCracken | |
| 5,078,557 | A | 1/1992 | McCracken | |
| D323,935 | S | 2/1992 | Ward | |
| 5,088,865 | A | 2/1992 | Beth et al. | |
| 5,094,575 | A | 3/1992 | Kieser et al. | |
| D326,597 | S | 6/1992 | Lee | |
| 5,117,879 | A | 6/1992 | Payne | |
| 5,139,061 | A | 8/1992 | Neilson | |
| 5,181,813 | A | 1/1993 | McCracken | |
| 5,188,492 | A | 2/1993 | McCracken | |
| 5,191,621 | A | 3/1993 | Brok | |
| D337,501 | S | 7/1993 | Witt | |
| D340,174 | S | 10/1993 | Hoshino et al. | |
| D341,305 | S | 11/1993 | Svetlik | |
| 5,265,657 | A | 11/1993 | Matsumoto et al. | |
| 5,273,089 | A | 12/1993 | Fuchs et al. | |
| 5,289,861 | A | 3/1994 | Hedrick | |
| 5,308,201 | A | 5/1994 | Wilson et al. | |
| D349,637 | S | 8/1994 | Hoshino et al. | |
| 5,347,684 | A | 9/1994 | Jackson | |
| 5,353,474 | A | 10/1994 | Good et al. | |
| 5,353,852 | A | 10/1994 | Stolzer et al. | |
| 5,361,851 | A | 11/1994 | Fox | |
| 5,368,424 | A | 11/1994 | Battenhausen | |
| 5,429,235 | A | 7/1995 | Chen | |
| 5,445,479 | A | 8/1995 | Hillinger | |
| 5,452,751 | A | 9/1995 | Engler, III et al. | |
| 5,469,601 | A | 11/1995 | Jackson | |
| 5,511,445 | A | 4/1996 | Hildebrandt | |
| 5,584,620 | A | 12/1996 | Blickhan et al. | |
| 5,590,989 | A | 1/1997 | Mulvihill | |
| 5,598,892 | A | 2/1997 | Fox | |
| 5,613,813 | A | 3/1997 | Winchester et al. | |
| 5,640,741 | A | 6/1997 | Yano | |
| 5,652,191 | A | 7/1997 | Patterson | |
| 5,662,440 | A | 9/1997 | Kikuchi et al. | |
| 5,671,789 | A | 9/1997 | Stolzer et al. | |
| 5,678,965 | A | 10/1997 | Strick | |
| 5,699,844 | A | 12/1997 | Witt | |
| 5,725,036 | A | 3/1998 | Walter | |
| 5,725,038 | A | 3/1998 | Tucker et al. | |
| 5,772,368 | A | 6/1998 | Posh | |
| 5,803,684 | A | 9/1998 | Wang | |
| 5,813,805 | A | 9/1998 | Kopras | |
| 5,829,931 | A | 11/1998 | Doumani | |
| 5,853,273 | A | 12/1998 | Coffey | |
| 5,853,274 | A | 12/1998 | Coffey et al. | |
| 5,902,080 | A | 5/1999 | Kopras | |
| 5,909,987 | A | 6/1999 | Coffey et al. | |
| 5,913,645 | A | 6/1999 | Coffey | |
| 5,918,652 | A | 7/1999 | Tucker | |
| 5,921,730 | A | 7/1999 | Young et al. | |
| D416,460 | S | 11/1999 | Bosten et al. | |
| 5,988,241 | A | 11/1999 | Bosten et al. | |
| 5,998,897 | A | 12/1999 | Bosten et al. | |
| 6,050,759 | A | 4/2000 | Bone | |
| 6,065,912 | A | 5/2000 | Bosten et al. | |
| 6,079,915 | A | 6/2000 | Bosten et al. | |
| 6,079,918 | A | 6/2000 | Buddendeck et al. | |
| 6,182,723 | B1 | 2/2001 | Bosten et al. | |
| 6,183,400 | B1 | 2/2001 | Pope | |
| D444,364 | S | 7/2001 | Evans | |
| 6,261,036 | B1 | 7/2001 | Bosten et al. | |
| 6,266,850 | B1 | 7/2001 | Williams et al. | |
| 6,289,952 | B1 | 9/2001 | Jones et al. | |
| 6,305,447 | B1 | 10/2001 | Rousseau | |
| 6,318,936 | B1 | 11/2001 | McFarlin, Jr. et al. | |
| 6,419,429 | B1 | 7/2002 | Long et al. | |
| 6,443,676 | B1 | 9/2002 | Kopras | |
| 6,474,378 | B1 | 11/2002 | Ryan et al. | |
| 6,505,659 | B1 | 1/2003 | Hummel | |
| 6,520,224 | B2 | 2/2003 | Smith | |
| 6,520,227 | B2 | 2/2003 | McFarlin, Jr. et al. | |
| D473,439 | S | 4/2003 | Grant et al. | |
| 6,550,154 | B1 | 4/2003 | Smith | |
| 6,725,892 | B2 | 4/2004 | McDonald et al. | |
| 6,726,414 | B2 | 4/2004 | Pientka et al. | |
| 6,739,066 | B2 | 5/2004 | Smith | |
| 6,779,954 | B2 | 8/2004 | Tomayko | |
| 6,792,984 | B2 | 9/2004 | Fontaine | |
| 2002/0020466 | A1 | 2/2002 | McFarlin, Jr. et al. | |
| 2002/0043294 | A1 | 4/2002 | McDonald et al. | |
| 2002/0079021 | A1 | 6/2002 | Smith | |
| 2003/0188441 | A1 | 10/2003 | Patton | |
| 2003/0205292 | A1 | 11/2003 | Smith | |
| 2003/0223835 | A1 | 12/2003 | Hummel | |
| 2004/0035495 | A1 | 2/2004 | Hassenberger et al. | |
| 2004/0194854 | A1 | 10/2004 | McDonald et al. | |
| 2004/0200543 | A1 | 10/2004 | McDonald et al. | |
| 2004/0250891 | A1 | 12/2004 | McDonald et al. | |
| 2004/0253068 | A1 | 12/2004 | Gerhardt et al. | |
| 2006/0102248 | A1 | 5/2006 | Cooper et al. | |

FOREIGN PATENT DOCUMENTS

| | | |
|---|---|---|
| CA | 657748 | 2/1963 |
| CA | 2314653 | 1/2001 |
| GB | 712071 | 4/1952 |
| GB | 1037969 | 9/1965 |

| | | |
|---|---|---|
| JP | 54051247 | 4/1979 |
| JP | 04297645 | 10/1992 |
| JP | 04297676 | 10/1992 |
| JP | 06136286 | 5/1994 |
| JP | 06164544 | 6/1994 |

OTHER PUBLICATIONS

Triton TRC-001, Router Woodworking, http://www.patwarner.com/triton.html, p. 1-2, Feb. 27, 2004.
Bosch 1617 Shop Router, Parts Diagram, Jul. 1998.
Bosch Router Models, Owners Manual, p. 1-22, http//www.boschtools.com.
Triton TRC-001 Review, 3.25 Plunge Router, http://www.mv.com/users/besposito/woodworking/triton/, Feb. 27, 2004.
Triton 3 ¼hp Plunge Router Review, http:/benchmark.20m.com/reviews/TritonRouter/TritonRouterReview.html, p. 1-4, Feb. 27, 2004.
Triton ½" Precision Router (TRA 001), http://www.triton.net.au/products/router_2.html, p. 1-3, Feb. 27, 2004.

* cited by examiner

ROUTER ELEVATING MECHANISM

CROSS REFERENCE

The present application claims priority under 35 U.S.C. §119(e) to U.S. Provisional Patent Ser. No. 60/490,117, entitled: *Router Elevating Mechanism*, filed on Jul. 25, 2003, which is hereby incorporated by reference in its entirety.

FIELD OF THE INVENTION

The present invention relates to the field of power tools and particularly to an adjustment mechanism for varying the position of a working tool.

BACKGROUND OF THE INVENTION

Often power tools require both fine positional adjustment and coarse adjustment for various components and in particular to adjust the position of the working tool. For example, routers, shapers, cut-off tools and the like may require coarse or rough adjustment and require fine or precision adjustment. Typical adjustment systems tend to trade-off fine adjustment capability for the ability to make rapid coarse adjustments or allow for fine adjustment while requiring additional time and effort to make a coarse adjustment. For example, a fixed base or standard router includes a motor housing enclosing a motor for rotating a bit. The depth to which the bit extends is adjusted by varying the position of the motor housing with respect to a sleeve included in the base for releasably securing the motor housing. The motor housing may be manually manipulated to slide the motor housing to the appropriate depth (such as by threading/unthreading the motor housing from the base (via a post interacting with a spiral groove included in an interior recess of the base sleeve). This procedure may be time consuming, require some skill/experience, may be difficult to conduct if the router is implemented with a router table, and the like.

Therefore, it would be desirable to provide an adjustment mechanism for varying the position of a working tool and particularly to a mechanism for varying the height of a router.

SUMMARY OF THE INVENTION

Accordingly, the present invention is directed to an elevating mechanism for power tools and in particular an elevating mechanism for fixed or standard base routers, cut-off tools, laminate trimmers, and the like.

In a first aspect of the invention, an elevating mechanism is configured for easy micro adjustment and coarse or macro adjustment. In an embodiment, a power tool includes a base configured to adjustably receive a motor housing for operating a working tool. A worm drive is pivotally coupled, in an eccentric configuration, to an eccentric lever. The eccentric lever adjustably coupled to at least one of the housing or the base. The eccentric lever is operable to cause the worm drive to be positioned into an engaged position with a rack assembly and a released position wherein the worm drive is remote from the rack assembly. The elevating mechanism is operable to permit rotational micro adjustment and macro manual adjustment wherein the worm drive is remote from the rack assembly for permitting coarse adjustment of the motor housing with respect to the base.

In further aspect of the invention, a power tool includes a base having a sleeve portion configured to adjustably receive a motor housing for operating a working tool. An eccentric lever is rotatably coupled to the base. A worm drive is pivotally coupled, in an eccentric manner, to the eccentric lever. The eccentric lever is operable to cause the worm drive to be positioned into an engaged position with a rack assembly and a released position wherein the worm drive is remote from the rack assembly. The elevating mechanism is operable to permit rotational micro adjustment and macro manual adjustment wherein the worm drive is remote from the rack assembly for permitting coarse adjustment of the motor housing with respect to the base.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings. Those of skill in the art will appreciate that the principles of the present invention may be implemented on a variety of power tools, such as a cut-off tool, a laminate trimmer, a lock mortising machine, a jam saw, a plunge router, a standard router, and the like without departing from the scope and spirit of the present invention.

Figure 1:
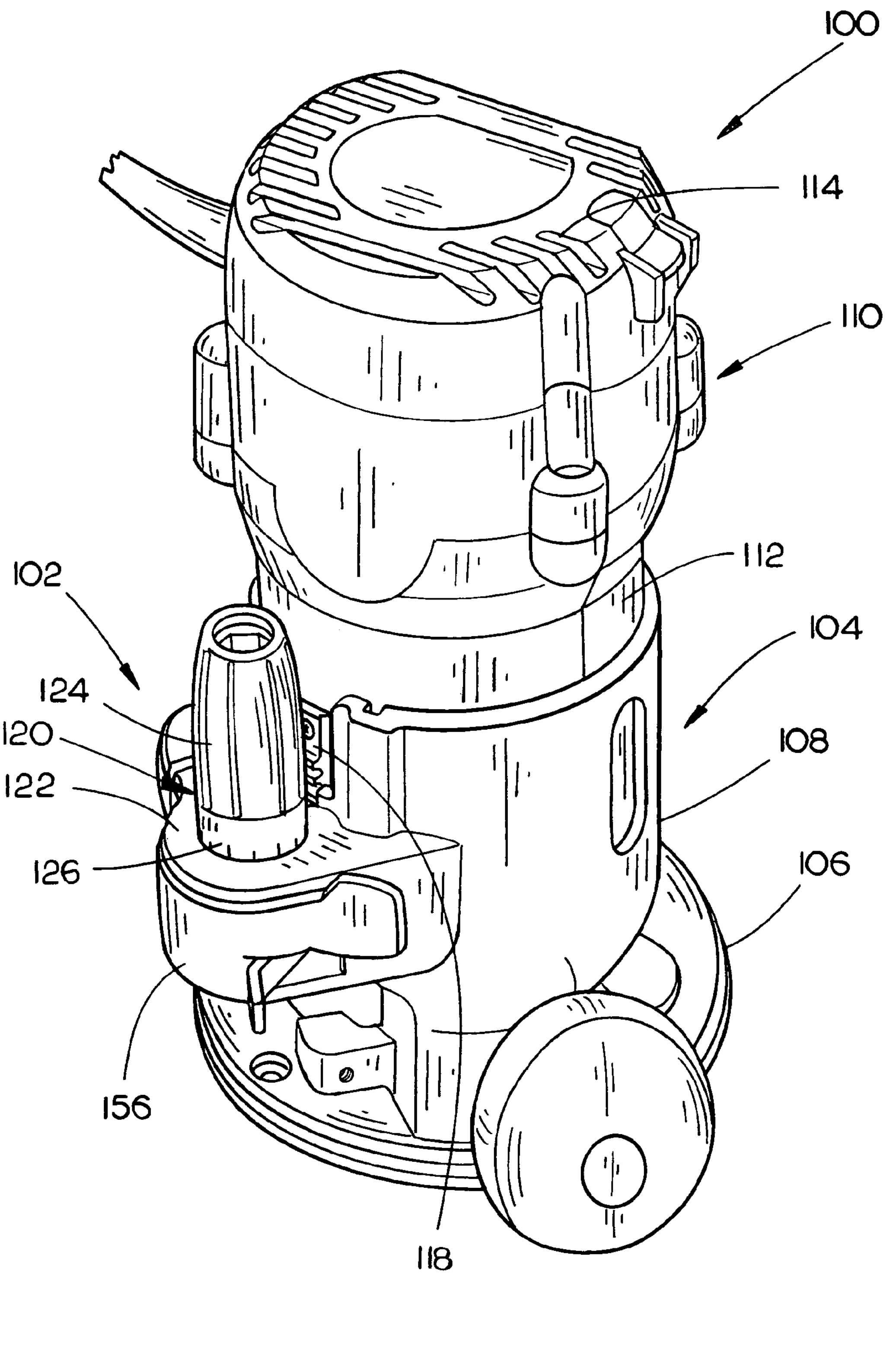
FIG. 1 is an isometric view of a router including an elevating mechanism in accordance with an aspect of the present invention.

Referring to FIG. 1, a standard or fixed base router 100 including an elevating mechanism 102 in accordance with the present invention is discussed. The router 100 includes a base 104. In the current embodiment, the base 104 includes a substantially planer or support portion 106 for at least partially supporting the router 100 on a workpiece. Additionally, a sub base 110 such as a disk of plastic or the like material having a low coefficient of friction in comparison to the base material (such as aluminum, steel or the like) may be included. A sleeve portion 108 is connected to the support portion 106. For example, the sleeve portion 108 is constructed to form a generally cylindrical central aperture for receiving a motor housing 110 therein. In the current embodiment, the motor housing has a main body 112 and an end cap 114. Preferably, the main body 112 is generally cylindrical for being adjustably received in the base sleeve 108. For example, the motor housing may be variously positioned within the base so as to vary the relative depth of a working tool, e.g., a router bit, with respect to the base.

Preferably, the sleeve portion 108 and the support portion 106 are unitary. In further embodiments, the sleeve 108 and support 106 are mechanically connected such as by fasteners. In the present example, the sleeve portion 108 has a seam or split (FIG. 2, 216) extending generally along an axis parallel to the direction along which the motor housing is received in the base. The furcated sleeve allows for a clamping assembly (such as a cam lever type device 156) to secure the relative position of the motor housing to the base by clamping the sleeve 108 generally about the motor housing 110. Those of skill in the art will appreciate a variety of securing devices such as various clamping assemblies, cam lock devices, and the like may be implemented as desired for fixing or securing the position of the motor housing with respect to the base.

Figure 3:
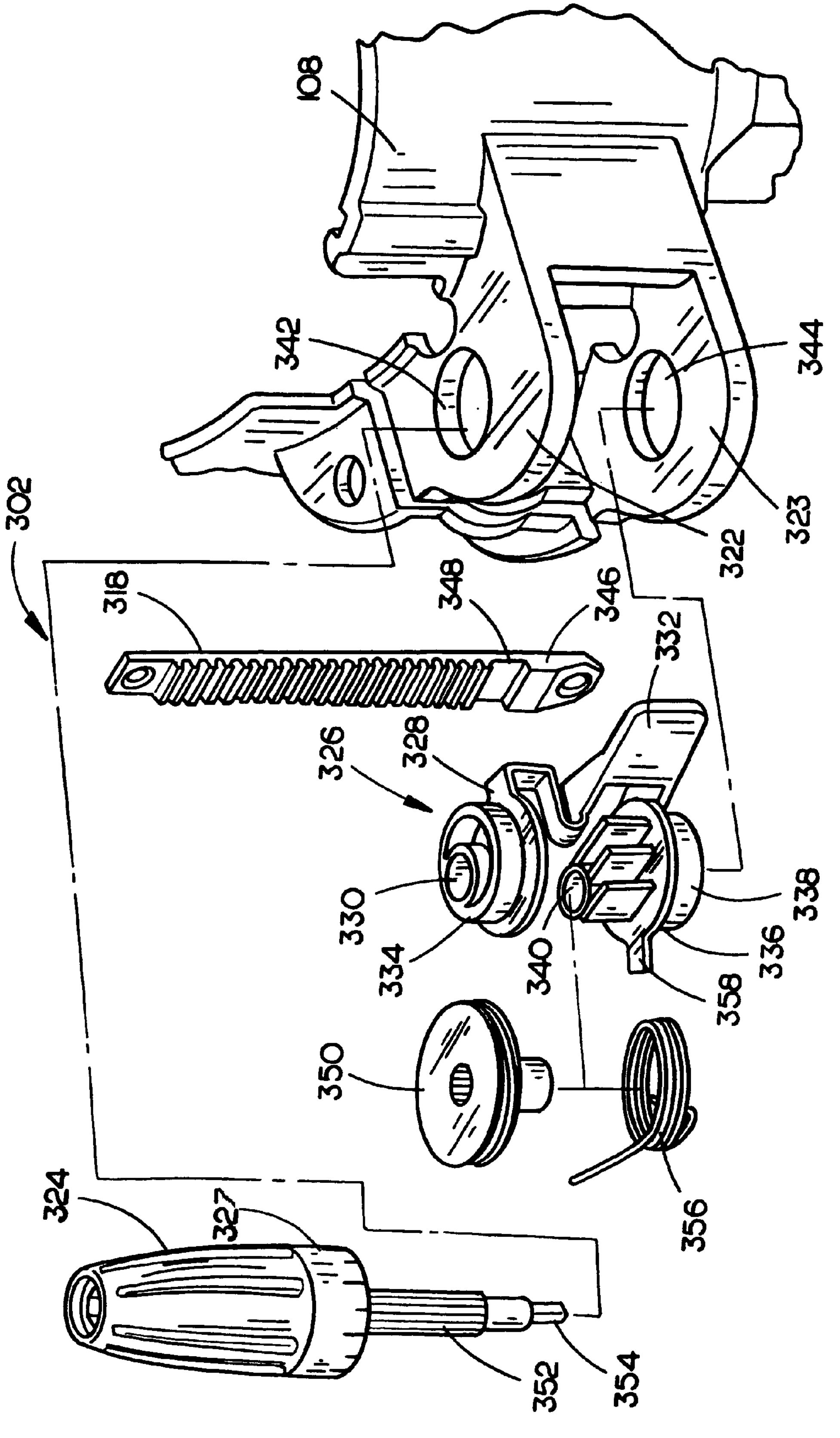
FIG. 3 is an exploded view of an elevating mechanism in accordance with an aspect of the present invention.

With continued reference to FIG. 1, in the current embodiment the elevating mechanism 102 includes a rack assembly disposed substantially parallel to a main axis of the motor housing 110. Preferably, the rack is sized so as to permit continuous adjustment of the associated working tool in the desired range, relative to the base. Suitable rack assemblies include a rack 118 or comb-tooth member which is mounted to the motor housing via fasteners, an adhesive, or the like. Utilizing a rack 118 mechanically coupled to the housing may allow for efficient manufacture, permit replacement, and the like. Referring to FIG. 3, preferably, a rack 318 is secured by a pair of fasteners. Alternatively, a rack may be integrally formed in the motor housing. For example, the teeth of the rack may be formed by machining in a series of recesses so as to form the rack along an outer surface of the main body portion of the motor housing 110. Those of skill in the art will appreciate that a rack assembly may be included on the base with a corresponding worm elevation mechanism components included in a corresponding base. Additionally, the rack/teeth may include a curved cross section so as to conform to the motor housing and/or promote meshing with a corresponding elevating mechanism components.

Figure 4:
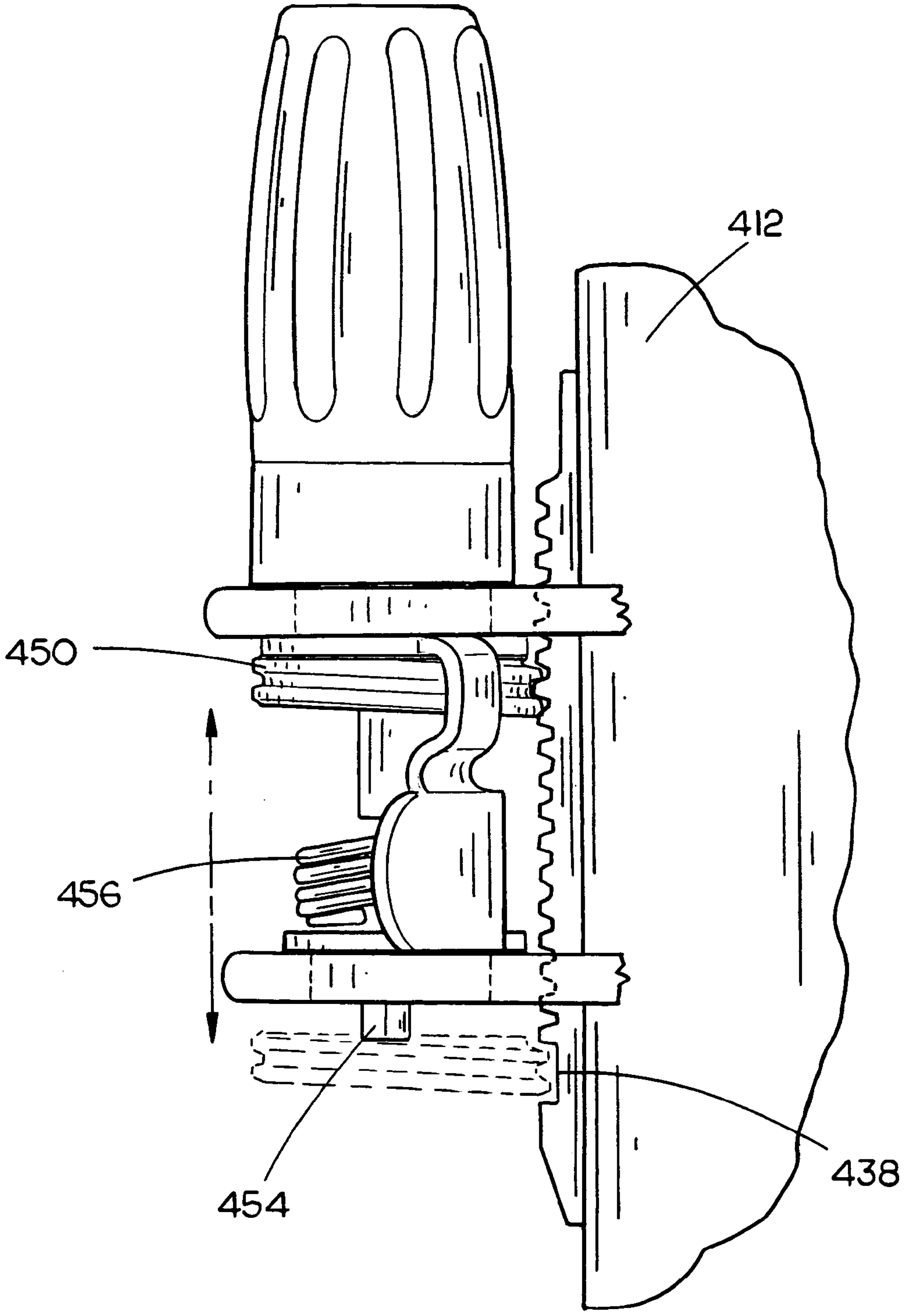
FIG. 4 is a cutaway view illustrating a worm drive generally engaging with a rack assembly, including an indication of a worm drive being aligned with a recessed portion of the rack assembly.

Referring to FIGS. 3 and 4, in a further aspect, a rack preferably includes a wedge shaped or tapered end 346. Inclusion of tapered end 346 orientated (generally) towards the base allows the rack to engage with a worm drive 350 upon sufficient initial insertion of the motor housing into the base such that the rack is inserted past a worm drive 350. In further embodiments, a non-toothed or recessed segment 348 is included in the rack assembly to prevent the rack from inadvertently running out of engagement with a worm drive. For example, a rack may be configured with a non-toothed segment 348 substantially equal to or greater than the threaded portion of the worm drive 350. Thus, upon the worm drive being pivoted into alignment with the non-toothed segment the worm drive will no longer adjust the position of the rack. See generally FIG. 4. In the previous manner the motor housing is prevented from inadvertently disengaging from the base. For example, a non-toothed segment may prevent the motor housing from disengaging from the base when the router is implemented with a router table.

Figure 2:
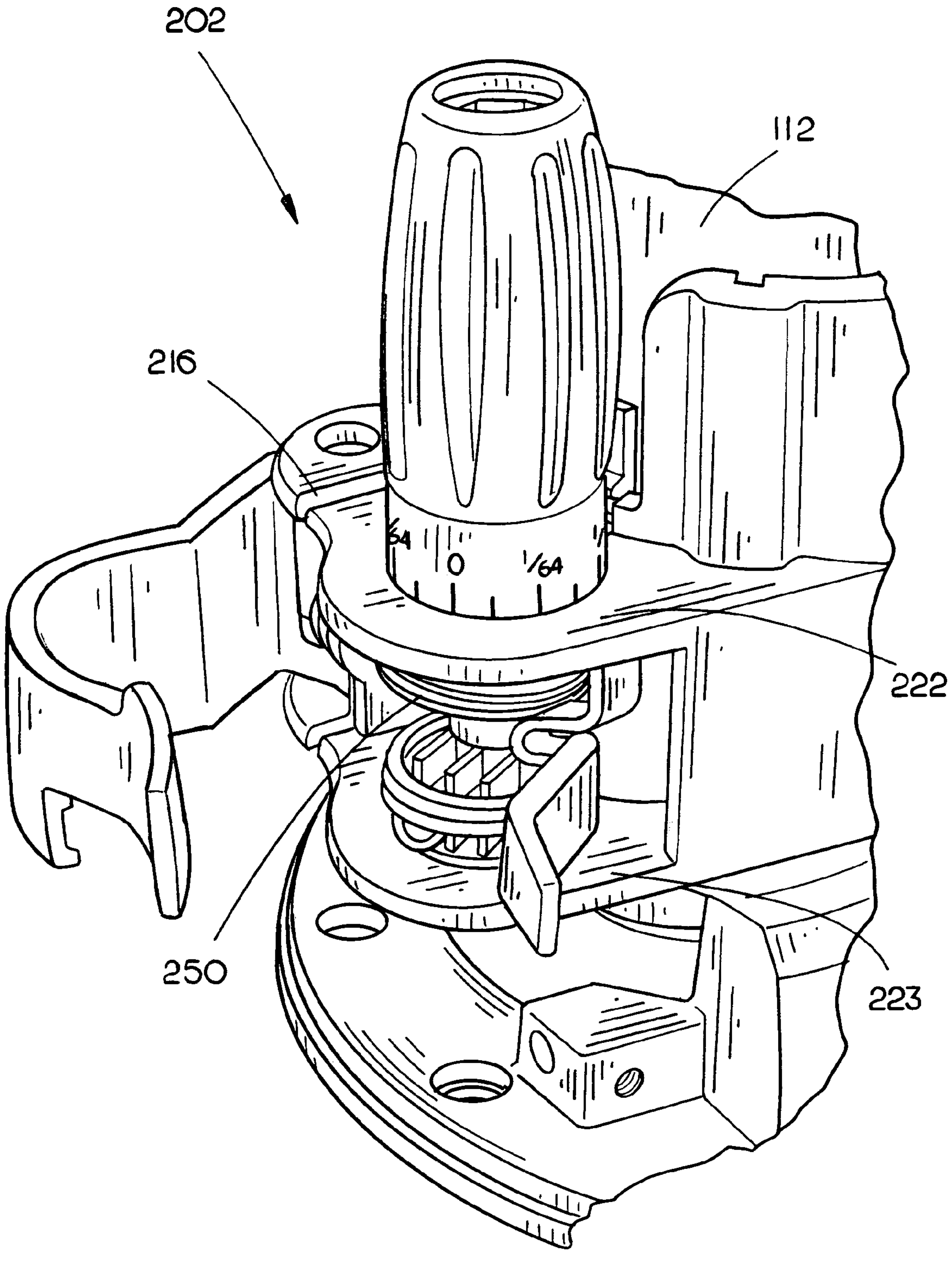
FIG. 2 is a cutaway enlarged view of an elevating mechanism, wherein a clamping mechanism further included on a router is disposed generally in a released orientation.

Referring to FIGS. 2 and 3, it will be appreciated that corresponding numbers refer to corresponding structures, a lever 226 is rotatably coupled to the base. In the present embodiment, the lever 226 is disposed between a pair of mounting tabs 222, 223 extending (generally) radially away from the received motor housing. Those of skill in the art will appreciate a base mounting/mountings may configured as desired for mounting or housing the lever and various elevating mechanism components. As may be best seen in FIG. 3, for example, the lever 326 includes a first eccentric tab 328 and a second eccentric tab 336 (substantially similar to the first eccentric tab) for pivotally coupling a worm drive therethrough. In the present example, the first and second eccentric tabs 328, 336 individually include generally cylindrical projections 334, 338 with apertures 330, 340 (eccentrically configured with respect to the tabs 328, 336). In the present embodiment, the cylindrical projections 334, 336 included on the first and second eccentric tabs 328, 336 are configured to permit rotation with respect to the base. For example, the cylindrical extensions 334, 338 are received in corresponding apertures included in the base tabs 322, 323 so that the lever 326 may rotate with respect to the base. In further embodiments, a lever may be received in a recess included in the base mounting. For instance, a recess may be included in a mounting for receiving the cylindrical projection included in the lever. Preferably, the lever 326 "snap-fits" the cylindrical projections 334, 338 into the respective mounting tab apertures 342, 344. The lever 326 may be formed plastic, metal or the like. Those of skill in the art will appreciate that a lever may be variously configured/shaped for permitting adjustable coupling of the drive assembly without departing from the scope and spirit of the present invention.

With continued reference to FIGS. 2 and 3, a worm drive 350 is pivotally coupled to the lever 326 in an eccentric configuration. In an advantageous embodiment, the threading of the worm drive is pitched so that substantially a single revolution of the worm drive 350 results in a ⅛" (one eighth inch) depth or elevation adjustment of the motor housing/working tool with respect to the base. Correspondingly, the teeth of the rack are configured or sized for meshing with the threading included in the worm drive. In the present embodiment, the worm drive 350 includes a central aperture for receiving a shaft 352. Further, the worm drive 350 and shaft 352 are configured to mechanically interconnect such that rotation of the shaft 352 results in rotation of the worm drive. For instance, at least a portion of the shaft may be hex shaped for engaging with correspondingly shaped walls formed in the worm drive.

Preferably, an adjustment knob 324 is fixedly secured generally to an end of the shaft 352 for permitting hand rotation of the shaft/worm drive. In an additional embodiment, a shaft includes a mechanical coupling on an end of the shaft for permitting height/depth adjustment from a second end (i.e., base end) such as when the power tool is utilized with a router table. For example, a power tool is coupled to the underside of a support surface with the bit extending through the support surface for performing an operation on a workpiece. In the current embodiment, the drive shaft 352 includes a hex shaped extension on a second end of the shaft (opposite an adjustment knob included on a first end of the shaft). The hex head is constructed for being captured by a corresponding hex shaped socket included on a removable wrench. For instance, the hex head is directed toward the base so that a user may extend a removable wrench through a support surface in order to vary the depth/elevation of an associated working tool. In further embodiments, a micro adjustment collar 327 is pivotally coupled to the adjustment knob and/or the shaft.

The present lever/worm drive configuration allows for ease of manufacture while permitting the worm drive 350 to be disposed between the first and second eccentric tabs 328, 336. In the foregoing manner, potential skew of the worm drive 350 with respect to a rack assembly is minimized. Those of skill in the art will appreciate that a worm drive may be constructed with a unitary mounting shaft in additional embodiments. Additionally, the worm drive 350/lever 326 may be variously configured as desired. It is the intention of this disclosure to encompass and include such variation. For example, a lever may be configured with a unitary structure through which the worm drive shaft extends. The lever structure, in an advantageous example is sufficiently large, with respect to the threaded portion of the worm drive, such that skew between the worm drive and rack is within tolerance.

Figure 5A:
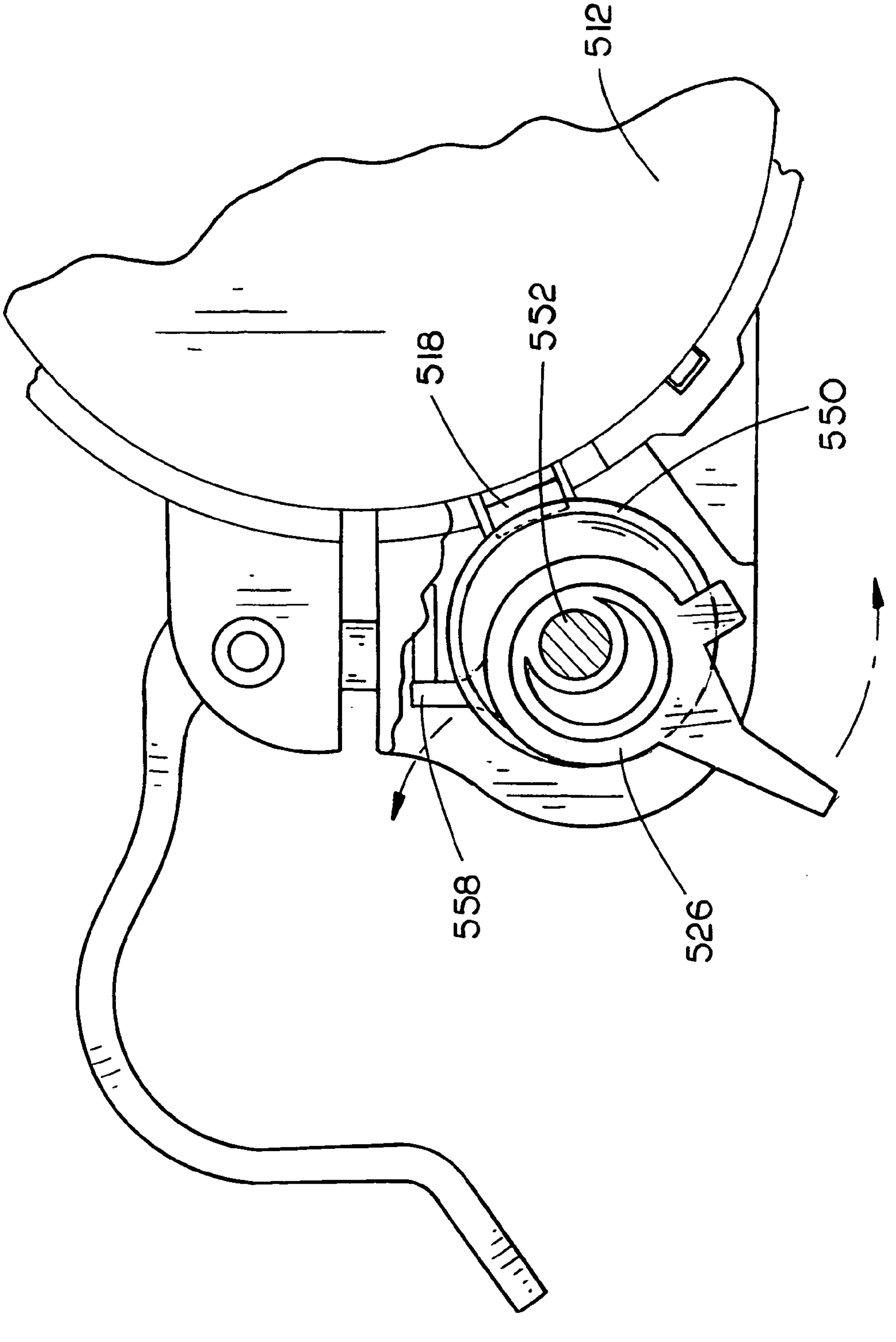
FIG. 5A is a top plan view of a worm drive disposed generally in an engaged position with respect to a rack assembly.
Figure 5B:
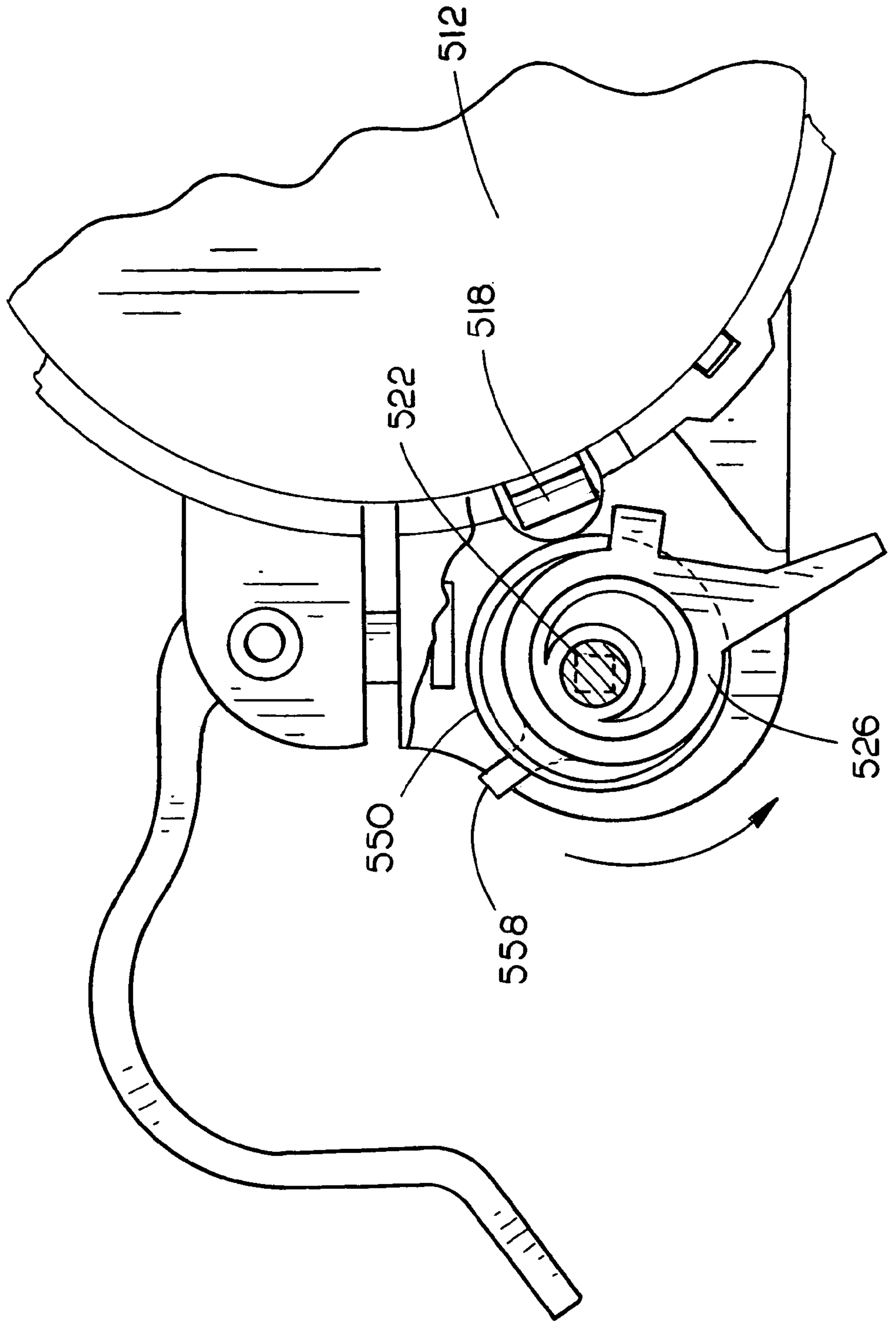
FIG. 5B is a top plan view of a worm drive disposed generally in release or remote position with respect to a rack assembly.

Referring to FIGS. 5A and 5B, the elevation mechanism is operable such that a worm drive 550 may be positioned into an engaged position with the rack assembly 518 (generally FIG. 5A) and into a released position (generally FIG. 5B) wherein the worm drive is remote from the rack 518. Preferably, the lever 526/worm drive 550 is biased into an engaged position wherein the threading on the worm drive engages the rack. For instance, (as may be seen in FIGS. 2 and 3) a torsion spring 356 is included for biasing the lever 326/worm drive 350 into engagement with the rack 318. Those of skill in the art will appreciate that various biasing devices, such as a leaf spring, etc., may be implemented as contemplated by one of skill in the art. A spring biased engaging configuration is preferable as this permits micro elevation adjustment without having to manipulate the lever 326. Additionally, a stop 358 may be included on or connected to the lever 326 for arresting the position of the lever into a desired engaging position. Referring to FIG. 5A, for example, the stop may be configured to contact a corresponding stop included on the base or on the lever mounting so as to prevent the threading on the worm drive from "bottoming out" or engaging with the teeth on the rack thereby increasing the frictional engagement. As may be seen in FIG. 5B, the lever 526 is configured to achieve a released position wherein the worm drive is remote from the rack. Disposing the worm drive in a remote position may permit coarse adjustment of the working tool/motor housing.

It is believed that the apparatus of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A power tool, comprising:
- a motor housing for enclosing a motor for operating a working tool;
- a base for adjustably receiving the motor housing;
- an eccentric lever adjustably coupled to at least one of the motor housing or the base;
- a worm drive pivotally coupled to the eccentric lever, the worm drive being eccentrically configured with respect to the eccentric lever; and
- a rack assembly disposed so as to be engaged by the worm drive to adjustably position the working tool with respect to the base,
- wherein the eccentric lever is operable to adjustably position the worm drive into an engaged position with the rack assembly and a released position in which the worm drive is remote from the rack assembly.

2. The power tool of claim 1, wherein eccentric lever includes a stop configured to align the worm drive into the engaged position.

3. The power tool of claim 1, further comprising means for biasing the worm drive into the engaged position.

4. The power tool of claim 3, wherein the biasing means is a torsion spring.

5. The power tool of claim 1, further comprising a shaft for pivoting the worm drive, the shaft having a first end and a second end, the first end of the shaft includes a mechanical coupling configured to accept a removable wrench.

6. The power tool of claim 5, further comprising an adjustment knob fixed to the second end of the shaft.

7. The power tool of claim 6, further comprising a micro adjust collar mounted to at least one of the adjustment knob or the shaft.

8. The power tool of claim 1, wherein the power tool is selected from the group consisting of a router, a plunge router, a laminate trimmer, a cut-off tool, a mortise machine, a lock mortise machine, and a rotary tool.

9. The power tool of claim 1, wherein the rack assembly is mounted to the motor housing.

10. The power tool of claim 1, wherein rack assembly is integrally formed in the motor housing.

11. The power tool of claim 1, wherein the worm drive and rack assembly are configured such that a single rotation of the worm drive is substantially equal to a ⅛" (one-eighth inch) relative position change between the motor housing and the base.

12. The power tool of claim 1, wherein the rack assembly includes a tapered end constructed to initially contact with the worm drive.

13. The power tool of claim 1, wherein the rack assembly includes a recessed segment for preventing the worm drive from running-out of the rack assembly.

14. A power tool, comprising:
- a motor housing for enclosing a motor for operating a working tool;
- a base including a sleeve portion configured for adjustably receiving the motor housing;
- an eccentric lever rotatably coupled to the base sleeve;
- a worm drive pivotally coupled to the eccentric lever substantially parallel to the motor housing, the worm drive being eccentrically configured with respect to the eccentric lever; and
- a rack assembly disposed so as to be engaged by the worm drive to adjustably position the working tool with respect to the base,
- wherein the eccentric lever is operable to adjustably position the worm drive into an engaged position with the rack assembly and a released position in which the worm drive is remote from the rack assembly.

15. The power tool of claim 14, wherein eccentric lever includes a stop arranged to align the worm drive into the engaged position.

16. The power tool of claim 14, further comprising means for biasing the worm drive into the engaged position.

17. The power tool of claim 16, wherein the biasing means is a torsion spring.

18. The power tool of claim 14, further comprising a shaft for pivoting the worm drive, the shaft having a first end and a second end, the first end of the shaft includes a mechanical coupling configured to accept a removable wrench.

19. The power tool of claim 18, further comprising an adjustment knob fixed to the second end of the shaft.

20. The power tool of claim 19, further comprising a micro adjust collar mounted to at least one of the adjustment knob or the shaft.

21. The power tool of claim 14, wherein the power tool is selected from the group consisting of a router, a plunge router, a laminate trimmer, a cut-off tool, a mortise machine, a lock mortise machine, and a rotary tool.

22. The power tool of claim 14, wherein the rack assembly is mounted to the motor housing.

23. The power tool of claim 14, wherein rack assembly is integrally formed in the motor housing.

24. The power tool of claim 14, wherein the worm drive and rack assembly are configured such that a single rotation of the worm drive is substantially equal to a ⅛" (one eighth inch) relative position change between the motor housing and the base.

25. The power tool of claim 14, wherein the rack assembly includes a tapered end constructed to initially contact with the worm drive.

26. The power tool of claim 14, wherein the rack assembly includes a recessed segment for preventing the worm drive from running-out of the rack assembly.

27. A router, comprising:

a generally cylindrical motor housing, for enclosing a motor for rotating a router bit, the cylindrical motor housing having a curved outer surface;

a base including a sleeve portion configured for adjustably receiving the motor housing, the base including a mounting;

an eccentric lever rotatably coupled to the base mounting, the eccentric lever defining an eccentrically disposed aperture which is constructed to generally extend radially from the curved outer surface;

a worm drive pivotally coupled to the eccentric lever substantially parallel to the motor housing, the worm drive being eccentrically disposed with respect to the eccentric lever, the worm drive including a shaft having a first and a second end, said shaft extending through the slot included in the base;

means for biasing the worm drive into the engaged position; and a rack assembly disposed so as to be engaged by the worm drive to adjustably position the working tool with respect to the base, wherein the eccentric lever is operable to adjustably position the worm drive into an engaged position with the rack assembly and a released position in which the worm drive is remote from the rack assembly.

28. The router of claim 27, wherein eccentric lever includes a stop arranged to align the worm drive into the engaged position.

29. The router of claim 27, wherein the biasing means is a torsion spring.

30. The router of claim 27, wherein the first end of the shaft includes a mechanical coupling configured to accept a removable wrench.

31. The router of claim 27, further comprising an adjustment knob fixed to the second end of the shaft.

32. The router of claim 27, further comprising a micro adjust collar mounted to at least one of the adjustment knob or the shaft.

33. The router of claim 27, wherein the rack assembly is mounted to the motor housing.

34. The router of claim 27, wherein the worm drive and rack assembly are configured such that a single rotation of the worm drive is substantially equal to a ⅛' (one-eighth inch) relative position change between the motor housing and the base.

35. The router of claim 27, wherein the rack assembly includes a tapered end constructed to initially contact with the worm drive.

36. The router of claim 27, wherein the rack assembly includes a recessed segment for preventing the worm drive from running-out of the rack assembly.

* * * * *